Nov. 20, 1934.　　　G. W. CRABTREE　　　1,981,448
COVER FOR LEAF SPRINGS
Filed March 3, 1932　　　2 Sheets-Sheet 1
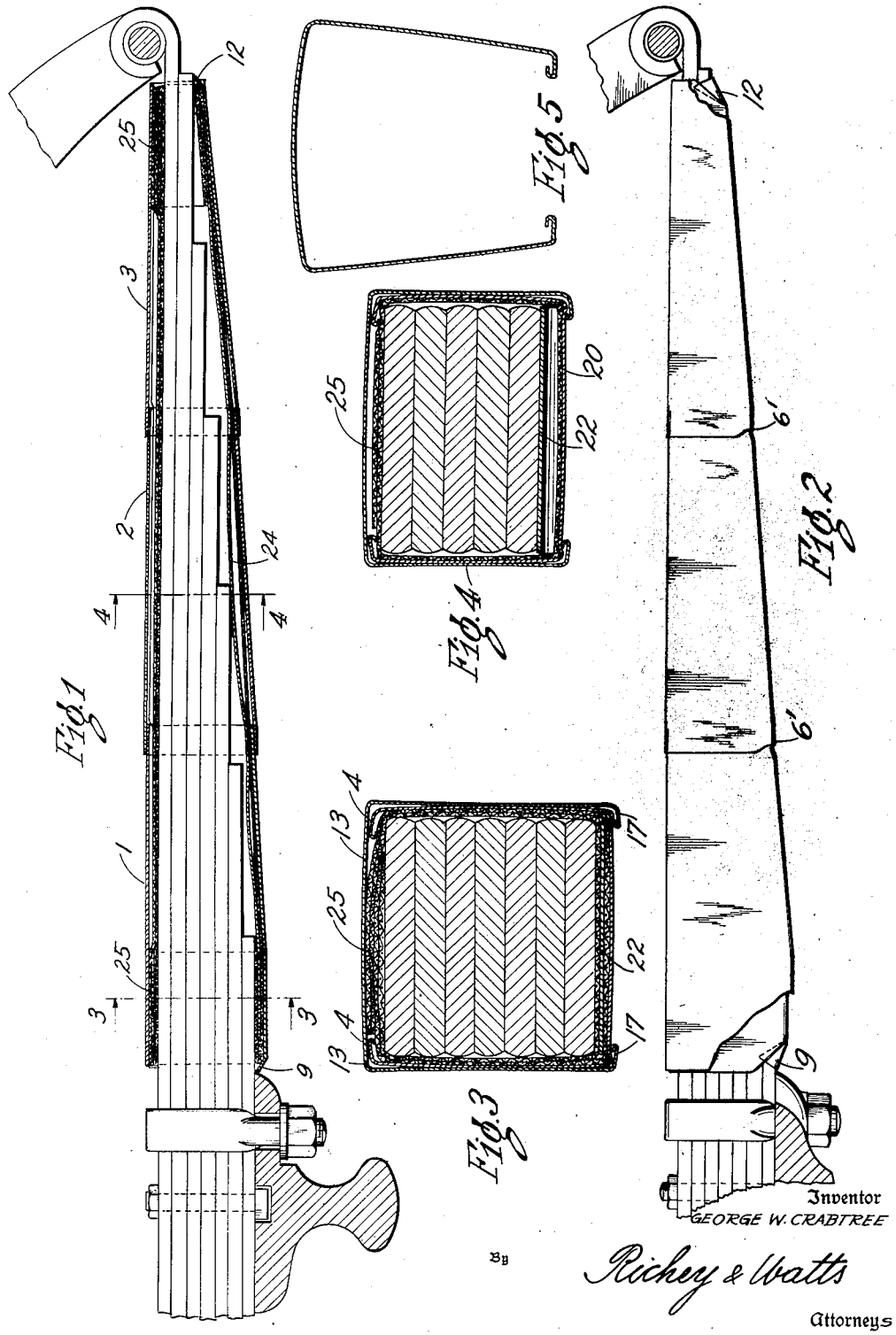
Inventor
GEORGE W. CRABTREE
By Richey & Watts
Attorneys

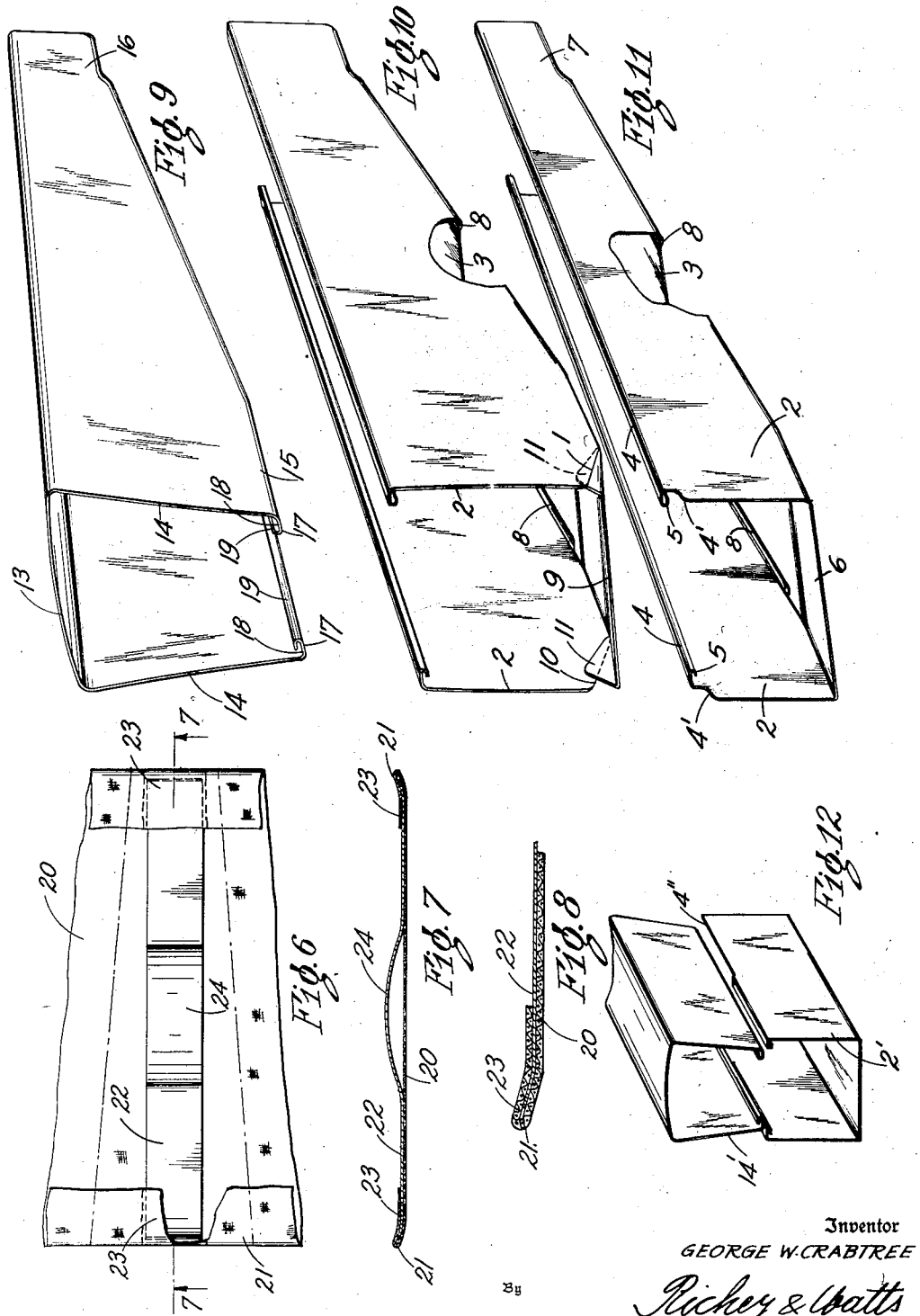

Patented Nov. 20, 1934

1,981,448

UNITED STATES PATENT OFFICE 1,981,448

COVER FOR LEAF SPRINGS

George W. Crabtree, Cleveland Heights, Ohio

Application March 3, 1932, Serial No. 596,525

10 Claims. (Cl. 267—37)

This invention relates to vehicular spring covers.

Vehicle springs having a plurality of overlapping leaves with lubricant therebetween tend, in use, to lose the lubricant and become dry, in which condition the spring rusts, becomes stiff and is less efficient in operation and liable to break. In addition, dirt accumulates upon the surface of the spring which accumulation is enhanced by the nature of the lubricant thereby rendering the spring unsightly. Various attempts in the past have been made, with more or less succeess, to protect the spring from loss of lubricant and from accumulation of extraneous material therefrom.

It is an object of this invention to provide a sheath or covering of novel construction for the leaf springs of automobiles and similar vehicles. It is an object of this invention to provide a metallic covering for laminated springs which comprises a plurality of sections organized for self adjusted and non-rigid support upon the spring. It is an object of this invention to provide a metal spring cover which neatly fits over the spring at all times and the parts of which snugly fit together at all times so that leakage and rattling of the cover are eliminated. It is another object of the invention to provide a metal spring cover which is interchangeably adaptable to fit springs of different lengths, sizes and construction. It is another object of the invention to provide a metal spring cover which is self-retaining and which has great strength combined with the necessary flexibility to permit movement of the spring. Another object of the invention is to provide a metal spring cover which is quickly and easily assembled upon or removed from the spring, which is constructed to retain itself in place and, which has great strength in use. Still another object of the invention is to provide a metal spring cover the parts of which float over each other and the cover as a whole floats on the spring so as to flex with flexure of the spring without localized stress in the cover, there being sufficient space between the cover and the spring to insure freedom from wear on the lining and distortion or abrasion of the cover. It is another object of the invention to provide a metal spring cover of top and bottom sectional channels in which the bottom channel supports itself upon the spring.

Other objects and advantages of the invention will appear in the following detailed description taken in connection with the accompanying drawings in which—

Fig. 1 is a view in longitudinal section of a spring cover of this invention mounted on a spring.

Fig. 2 is a view in elevation, partially broken away, of the spring cover mounted on a spring.

Figs. 3 and 4 are cross sectional views taken on sections 3 and 4 of Fig. 1.

Fig. 5 is a cross sectional view of a top section.

Fig. 6 is a detailed view illustrating the liner for the cover.

Fig. 7 is a view in cross section on line 7—7 of Fig. 6.

Fig. 8 is a detailed view in cross section showing an end portion in large detail, of the view of Fig. 7.

Fig. 9 is a view in perspective of a top channel.

Fig. 10 is a view in perspective partially broken away and in section of an end bottom channel.

Fig. 11 is a view similar to Fig. 10 but showing an intermediate bottom channel.

Fig. 12 is a perspective view of an extension section.

A spring cover in use is subjected to considerable wear and tear from the elements and from mechanical abrasion both from the spring and from objects striking against the cover so that it is desirable to make the spring cover of considerable strength and rigidity. At the same time, the operation of the spring makes it necessary to provide a spring cover having the capacity to flex or twist torsionally with movement of the spring without affording such resistance to movements of the spring as would modify its operation. Accordingly, I provide a spring cover made up of a plurality of sections each of which when mounted upon the spring is very strong and has rigidity to a large degree against distortion but still retains capacity to flex and to partake of independent longitudinal movement. In order to provide for flexing of the cover the sections are overlappingly fitted at their ends to provide a plurality of joints along the length of the cover each of which provides a secure union between the adjacent sections and at the same time permits sufficient relative movement between the adjacent sections as to accommodate movement of the spring without breaking the joint or placing undue strain upon the body of the section. As illustrated in Fig. 1 the spring cover is made up of three sections 1, 2 and 3. Obviously more or less sections may be provided according to the length of the spring and according to the length of each section.

In order that the cover may be assembled or disassembled conveniently and quickly, the sections are made in top and bottom halves each of which may be and preferably is a channel of substantially U-shape cross section as illustrated in Fig. 5. The sides of the top and bottom channels overlap to provide a rigid and strong side wall construction and at the same time to afford adequate support for the channels. In order better to exclude foreign matter and moisture the channels, which make up a composite channel, are arranged so that the sides of the top overlap those of the bottom channel.

An intermediate bottom channel is illustrated in Fig. 11 and comprises the straight parallel side walls 2 upstanding from the bottom 3, the channel being formed as an integral piece from spring material. Since the bottom composite channel is applied to the spring first it is desirable to provide means for holding the channel in place while the top channel is being mounted. The walls 2 are inturned at their margins to form beads 4, the margin of each bead 4 being turned upon itself, as illustrated at 5, so that a marginal bead is provided for overlaying and contacting against the upper portion of the spring. The channel, as shown, may be applied without presenting any sharp or rough edges and, when in position the nature of the bead is such that it provides a resilient clasp for holding the channel snugly in place on the spring and at the same time affords sufficient play to permit flexing of the spring, without causing looseness or rattling of the cover.

As illustrated in Fig. 11, the bottom channels are of tapered form, except the ends 6 and 7, the end 6 being squared and enlarged to receive the squared end of the next adjacent section and the end 7 is squared to fit into the squared end of the next adjacent section thus making the bottom walls of the joints in alignment with the spring leaves. The beads 4 may be modified slightly at the ends as indicated at 4' to accommodate the adjacent section. The interfitting ends of adjacent sections fit closely together so that a joint affording substantial frictional resistance to disruption is provided. The free corners 5—5 of the channel end 6 and the corresponding free corners of the larger ends of all the channels (except the larger end channels) may be cut away as shown at 4'—4' in Fig. 11 and as shown at 6'—6' in Fig. 2 of the similar top channels to allow relatively free movement of adjacent sections when the spring is flexed upwardly and downwardly. Along the side margins of the bottom wall 3 the metal is shaped to form a ridge 8, for a purpose later to be described, said ridge extending to and ending at the squared ends 6 and 7. The various bottom sections may be fitted together and applied as a unit to the spring. The larger end of the bottom channel, as illustrated in Fig. 10, is provided with a lip 9 which is formed by slitting the metal along edges 10 and turning up the lip 9 with the marginal wings 11 overlapping the side walls 2. As shown in Fig. 2, the opposite end of the bottom channel is provided with a turned up lip 12 similar in construction and arrangement to lip 9. When the bottom composite channel of the cover is fitted upon the spring the lips 9 and 12 are pressed yieldingly against the spring to seal the ends of the spring cover, and serve to accommodate different thicknesses of springs.

The top composite channel is similar to the bottom composite channel both being of the same width while the top composite channel is slightly deeper than the bottom composite channel. As illustrated in Fig. 9, the top channel comprises the top wall 13 and the side walls 14 formed from a single piece of spring metal with the side walls 14 converging and the top wall 13 slightly bowed. The side walls 14 are sprung apart until they are substantially parallel when mounted on the spring. The side walls 14 of the top channels are tapered, except at the ends 15 and 16, the end 16 being squared in order to interfit with the squared end of the adjacent section, while the end 15 is squared to conform to the squared lip end 9, Fig. 10 when mounted on the spring. Thus a portion of the larger end of the cover is formed into a rectangular tube, which may vary in length, or within or over which may be fitted a similar rectangular tube so as to lengthen or shorten the cover, without altering its depth, to accommodate springs of different length. The top sections all are of similar construction differing only in size there being no difference in construction between the intermediate and the end sections except for lengthening as above stated. The top channels may be fitted together into a single top channel unit which may be fitted onto the spring over the bottom channel unit. In order that the top channels may be securely held in place when mounted on the spring and in order that the top and bottom composite channel may fit together snugly and the cover as a whole may snugly fit upon the spring, the side walls 14 are provided at their marginal portions with beads 17 having walls 18 at substantially right angles to the walls 14 and the re-entrantly turned margins 19. When the top composite channel is fitted over the bottom composite channel on the spring, the beads 17 overlap the ridges 8 of the bottom channels to securely lock the top composite channel in place. In addition, due to the construction of the beads and the nature of the metal the beads are sprung slightly when in place thereby exerting a spring tension on the top composite channel to hold it in place. The top composite channel is of such depth that when mounted upon the bottom composite channel the beads 4 of the bottom composite channel contact with the top walls 13 of the top composite channel the beads 4 being sprung slightly, thus insuring that the top and bottom composite channels will remain in contact during flexure of the spring thereby eliminating noise and looseness of the parts.

It will be noted that along the side walls of the cover where flexure is not applied the metal is of double thickness providing strength and rigidity. In addition, the channels are overlapped at the corners which greatly enhances the rigidity of the sections while the construction is such that torsional flexure of an individual section may take place without disrupting it. By arranging the yielding marginal edges of the side wall of one channel at the non-yielding corners of the interfitting channel, the corners and margins being interlocked, each section as well as the whole structure is greatly strengthened and all tendency for a channel to spring loose when the cover is flexed is overcome. By forming the ends of each section with the walls thereof in squared relation proper alignment of the joints with the spring leaves is assured in the assembled cover since the top and bottom walls of the joints are substantially parallel with the spring leaves. By making the channels of like width the top margins of the bottom channel are pressed into close engagement with the top leaf of the spring by the side walls of the top channel and, the side walls of the top channel being convergent, the spreading of the free margins of the side walls of the top member causes those side walls to press against the side walls of the bottom member thereby insuring that the beads 17 will be held in place thus eliminating any looseness between the sections. It will be observed that the parts of the spring cover as a whole are not connected rigidly with each other or with any portion of the spring but form a flexible unit the parts of which float more or less independently of each other and more or less freely on the spring adjusting itself to the movements of the spring without any localized stress on the cover and without exerting substantial stress upon the spring.

Springs differ in design from vehicle to vehicle so that springs of like taper and size, all of which would require a single standard cover of the type herein disclosed, may differ substantially in length. In order to render the spring cover of this invention adaptable to springs of different length, an extension section is provided, which is illustrated in Fig. 12. The extension section is made up of channels 2' and 14' are not tapered and, accordingly, when these channels are combined to form a section, the section is in the form of a regular rectangular prism. Such a section may be combined with the other sections of the cover by telescopically interfitting the ends thereof, the extension section being arranged at the fixed end of the spring. It will be noted that the channel 2' has the bead 4 partially removed as indicated at 4''. As pointed out hereinbefore, the ends of the beads 4 may be modified slightly in order to accommodate the end of the adjacent channel. Between the main sections of the cover the extent of overlap is always approximately the same so that the bead 4 may be modified for a fixed distance from the end of the channel in order to accommodate the adjacent end of a main channel. However, in the case of the extension section illustrated in Fig. 12, it may be desirable to overlap the bottom channel 2' with the adjacent channel 2 by a distance greater than the usual overlap and accordingly the bead has been removed from section 2' as indicated at 4'' in order that the channel 2' may be overlapped in variable lengths with the adjacent channel 2. The channels 2' and 14' making up the extension section illustrated in Fig. 12 may be made in various lengths or a standard length may be provided and the channels cut off to form a section of the desired length.

A liner 20 arranged between the cover and the spring is provided. The liner 20 may be of any suitable textile material and is of the shape shown in Fig. 6. The ends of the liner are turned on themselves and sewed or otherwise attached to the body of the liner. A spacer spring 22 has its ends 23 arranged in the seam or pocket 21, the medial portion 24 of the spring 22 being curved. In assembling the cover on the spring the bottom unit is first built up and the liner 20 inserted therein with the spring 22 arranged along the bottom of the composite channel with curved portions 24. The bottom composite channel is then applied to the spring, being sprung in place, the top margins of the liner 20 being folded over the top of the spring as indicated at 25 in Figs. 3 and 4. Then the top composite channel is applied over the bottom composite channel as before described, the base portion 13 of the top composite channel resting against the liner at the ends of the cover as illustrated in Figs. 1 and 3. The spring 22 engages the spring of the vehicle along the high portion 24 thereof thus compressing the spring 22 to maintain the liner 20 and the cover in spaced relation from the leaves of the spring. The spring 22 also serves to press the cover tightly on the spring of the vehicle and to hold it snugly in place. The spring 22 may be constructed and arranged so that the ends of the raised portion 24 may be arranged in juxtaposition to joints between sections of the cover while the intermediate portion of the raised part 24 engages one of the spring leaves. The seams of the liner form a packing at the ends of the cover which prevents leakage of lubricant therefrom or seeping of liquids thereinto.

The metal of the cover may be stainless steel or other rust resisting protective coating may be formed thereover.

Thus a spring cover has been provided which may easily and quickly be assembled on the springs of a vehicle, which supports itself in place without the use of additional means and floats upon the vehicle spring so as to accommodate itself to movements of the spring. The spring cover is of a strong construction affording adequate flexibility and completely protecting the spring from foreign material while preventing loss of lubricant. The spring cover is of such construction and arrangement that it accommodates itself to the movements of the spring without rattling either of the parts between themselves or of the cover on the spring. While one embodiment of the invention has been disclosed by way of illustration it is not intended so to limit the invention inasmuch as modifications may be made therein by one skilled in that art without departing from the spirit and scope of the invention as defined by the following claims.

I claim:

1. A cover for leaf springs having bottom and top halves, said bottom half being constructed and arranged to be mounted on the spring in self-supporting engagement therewith, a liner for said cover, a leaf spring having ends arranged in pockets in the liner and adapted to be expanded by contact with the leaves of the spring and the cover so as to maintain the liner distended.

2. A cover for leaf springs having a plurality of box-like sections telescopically fitted together at the ends thereof, a liner arranged within the cover and surrounding the spring, a blade spring having ends arranged in pockets at the ends of the liner and having a cambered intermediate portion adapted to engage the leaf spring so as to compress the blade spring and hold the cover snugly to the spring.

3. A cover for leaf springs having a plurality of sections composed of a pair of top and bottom U-shaped channels, said bottom channel having inturned and re-entrantly turned margins adapted to overlie and press against the margins of the spring top, the top channel having inturned and re-entrantly turned margins adapted to overlie and press against the base of the bottom channel, a fabric liner for the cover surrounding the spring and sealing the ends of the cover, a cambered spring strip arranged in one of the channels lengthwise of the spring and adapted to be compressed by engagement with the leaf spring.

4. A cover for leaf springs having a plurality of sections composed of a pair of top and bottom U-shaped channels, said bottom channel having inturned and re-entrantly turned margins adapted to overlie and press against the margins of the spring top, the top channel having inturned and re-entrantly turned margins adapted to overlie and press against the base of the bottom channel, the base of the bottom channel having ridges therealong over which the margins of the top channel are sprung, a fabric liner for the cover surrounding the spring and sealing the ends of the cover, a curved blade spring arranged to lie in the cover between the sealed ends of the liner and adapted to be compressed by engagement with the leaf spring.

5. A cover for leaf springs comprising a plurality of box-like sections telescopically fitted together at the ends thereof, a fabric liner disposed about the spring within the cover, the end portions of the liner being arranged to form additional packing at the ends of the cover, and resilient means engaging said end portions and extending longitudinally of the cover and bearing against the liner for maintaining the liner in distended position and snugly against the spring in said cover.

6. A cover for leaf springs having a plurality of sections composed of U-shaped channels formed with end portions which telescope with the ends of the channels of the adjacent sections, one channel of each section having means at the marginal edges thereof for securing the channel to the spring, the other channel having means at the marginal edges thereof for securing the channel to the first channel, whereby the cover is sealed and the channels rendered self-locking.

7. A cover for leaf springs having a plurality of sections each of which comprises a pair of top and bottom U-shaped channels having end portions which telescope with the ends of the channels of the adjacent sections, the bottom channel having inturned margins adapted to press against the top of the leaf spring and the top channel having inturned margins adapted to engage and inter-lock with the bottom channel, whereby the cover is sealed and rendered self-locking.

8. A cover for leaf springs having a plurality of sections each of which comprises a pair of top and bottom U-shaped channels, said bottom channel having inturned and re-entrantly turned margins adapted to overlie and press against the margins of the spring top and the top channel having inturned and re-entrantly turned margins adapted to overlie and interlock with the base of the bottom channel, whereby the cover is sealed and the channels locked in position without requiring auxiliary supporting means.

9. A cover for leaf springs having a plurality of sections each of which comprises a pair of top and bottom U-shaped channels, the bottom channel having inturned and re-entrantly turned margins adapted to overlie and press against the margins of the spring top and the top channel having inturned and re-entrantly turned margins adapted to overlie and press against the base of the bottom channel, said base having ridges thereon over which the margins of the top channel are sprung, to thereby lock the sections in sealed position without requiring auxiliary supporting means.

10. A cover for leaf springs formed of sheet metal top and bottom channels constructed and arranged to enclose a spring and to conform substantially to the contour of the spring, the edges of the end portions of the bottom channel at opposite extremities of the cover being slitted and bent upwardly to form resilient lips on the cover at each end thereof which press against the bottom of the leaf spring and close the ends of the cover about the spring, the lips overlapping the side walls of the channel to effect complete end closures.

GEORGE W. CRABTREE.